United States Patent [19]

MacCracken

[11] Patent Number: 4,671,347

[45] Date of Patent: Jun. 9, 1987

[54] SUPERDENSITY ASSEMBLY SYSTEM FOR HEAT EXCHANGERS

[76] Inventor: Calvin D. MacCracken, 325 Morrow Rd., Englewood, N.J. 07631

[21] Appl. No.: 824,538

[22] Filed: Jan. 31, 1986

Related U.S. Application Data

[62] Division of Ser. No. 662,387, Oct. 18, 1984, Pat. No. 4,616,390.

[51] Int. Cl.⁴ ............................ F28D 19/00; F28F 9/00
[52] U.S. Cl. ....................................... 165/10; 165/162; 165/172; 165/905; 248/68.1; 248/74.2
[58] Field of Search ................. 165/162, 172, 178, 10, 165/DIG. 8, 905; 248/74.2, 68.1

[56] References Cited

U.S. PATENT DOCUMENTS

| | | | |
|---|---|---|---|
| 3,391,041 | 7/1968 | Moore | 29/157.3 R |
| 4,054,980 | 10/1977 | Roma | 165/172 X |
| 4,294,078 | 10/1981 | MacCracken | 165/163 X |
| 4,403,645 | 9/1983 | MacCracken | 165/10 |

FOREIGN PATENT DOCUMENTS

| | | | |
|---|---|---|---|
| 123424 | 6/1967 | Czechoslovakia . | |
| 0146817 | 7/1985 | European Pat. Off. | 165/162 |
| 2017895A | 10/1979 | United Kingdom | 165/DIG. 8 |

Primary Examiner—Albert W. Davis, Jr.
Assistant Examiner—Randolph A. Smith
Attorney, Agent, or Firm—Charles J. Brown

[57] ABSTRACT

A coil tube bundle for a heat exchanger wherein substantially rigid strips are formed with substantially equally spaced slots inwardly along a front edge thereof with each slot defining a seat opening through a narrower funnel throat, and flexible tubes of resilient circular cross section disposed across aligned rows of said strips and embraced within the seats of the slots to form an interconnected grid of rigid strips and flexible tubes, the grid being coiled to a bundle with the strips parallel to a central axis and the tubes forming spirals with convolutions contacting and spaced apart by edges of the strips opposite the slotted front edges and with the tubes supported at substantially equally intervals throughout their lengths, the plastic material of the tubes and strips being non-brittle at water-freezing temperatures. The strips and tubes are preferably of slippery plastic which is non-brittle at water-freezing temperatures.

11 Claims, 4 Drawing Figures

SUPERDENSITY ASSEMBLY SYSTEM FOR HEAT EXCHANGERS

This is a division of application Ser. No. 06/662,387, filed Oct. 18, 1984, and now U.S. Pat. No. 4,616,390, Oct. 14, 1986.

FIELD OF THE INVENTION

The present invention is in the field of phase change thermal storage. More particularly this invention relates to a superdensity assembly method and system for plastic heat exchangers of the coiled tubing bundle type positioned in cylindrical tanks having vertical axes for resisting the large buoyancy forces which are generated by ice build-up on the multiple tubes and enabling changes in predetermined tubing densities throughout various tanks to be accomplished easily and reliably for meeting the needs of various applications.

BACKGROUND OF THE INVENTION

The present invention is an improvement over the invention in U.S. Pat. Nos. 4,294,078 and 4,403,645 of the present inventor.

There are a variety of applications which require the fast melt down of phase change material (PCM) from its solid, e.g. frozen or ice state, into its liquid, e.g. melted or water state, in order to provide an intense surge of cooling over a relatively brief time span. Examples of such applications include a short church service, brief use of an auditorium or theater, providing cool air to an airplane while it's unloading and loading passengers, levelling short term combinations of loads, and cooling computers or spaces during a brief power outage where the stand-by generator only needs to run a pump and blower but not the refrigeration equipment. An example of such a fast melt down application would be a large airport in which the central air conditioning system electrical load on certain summer nights coincides with and thus adds to the airport illumination electrical load for two hours before the air conditioning is shut off, thereby causing an expensive 2000 KW peak electrical demand, which would cost more than $50,000 per month in demand charges, that could be avoided by the use of fast melting stored ice.

Another example of such a fast melt down application would be an airlines terminal at a hub airport for many outlying cities, where more than a dozen passenger airplanes must simultaneously be provided with cool air for one hour while passengers are shifting to other flights to their respective outlying destinations. Then the gates will be empty for some time until another group of planes arrive together at the hub airport.

As a further example of an application calling for an intense burst of cooling for a brief period, it is noted that a computer installation requires the back-up of uninterruptible power systems (UPS) during a power failure so that their valuable memories will not be lost. To size UPS to provide cooling is very expensive. Computers heat up and become damaged very quickly if run without cooling, if even only for the time to store away memory content into magnetic discs.

In order to meet the requirements of these brief but intense cooling situations it would be possible to employ a relatively large number of the thermal storage tanks disclosed in U.S. Pat. Nos. 4,294,078 and 4,403,645 and then to operate all of their heat exchangers simultaneously in parallel with each other for obtaining their combined cooling effects. However, such attempted use of numerous tanks involves an expensive, large scale installation.

If an attempt is made to crowd more heat exchange tubing into a tank for increasing the cooling effect, an unexpected problem is encountered. Assuming that the PCM being used is water, the water surrounding the tubes becomes frozen completely solid when the tank is fully charged with cooling, thus, it will lose its buoyancy when all the liquid has become frozen. However, when the ice is nearly all frozen, say 90% or so, a maximum buoyancy force is equal to the weight of the displaced liquid less the weight of the displacing object, the buoyancy force at 90% frozen in water/ice is equal to 8.33 lbs/gallon times the approximately 9% expansion when ice is frozen. The heat exchanger tubes themselves, being made of a plastic slightly lighter than water and filled with an anti-freeze liquid solution slightly heavier than water, can be neglected. Thus, a tank holding 2,000 gallons of water will have a buoyancy force of $8.33 \times 2,000 \times 0.09 \times 0.90 = 1,350$ lbs on the tubes having a built-up ice coating.

In a phase change liquid salt solution having a density as high as 1.8 times the density of water, the buoyancy of the heat exchanger volume itself would also have to be taken into account, and thus the buoyancy forces can be much higher. If the heat exchanger, weighing the same as water, occupied 25% of the volume of the tank and the heavy phase change material did not change volume as it froze, the buoyancy force on the heat exchanger would be $0.25 \times 2,000 \times (1.8 - 1.0) \times 8.33 = 3,330$ lbs.

When water freezes to solid ice or another phase change material freezes solid, crystals are formed which create strong local forces. Thus, I have found that a heat exchanger imbedded in such a crystallized mass must be somewhat flexible and resiliently deformable in its structure and, in its components to prevent breakage but also must have the inherent strength to resist the buoyance forces. Also, the components must be non-corrodible and inexpensive, since the heat exchanger would include many more components than in the above patents. Also, the component tubes and their support members are less likely to be deformed if the ice does not stick to their surfaces too strongly, as is noticed in an ice cube tray of a freezer where ice cubes can be dislodged by bending the tray. The material of which the tubes and support members are made must also not become brittle at low temperatures.

SUMMARY

This invention enables the crowding or superdensity packing of far more heat exchange area per unit volume within a tank containing PCM without undue cost, weight, pressure drop, manufacturing or handling operations, or structural weakening and while being capable of resisting the large buoyancy forces involved. The novel assembly method and system allow for any degree of heat exchange density or surface area per unit volume in the coiled plastic tubing heat exchanger that is desirable for a given cooling application.

I have found the reliable, practicable answers to all of the problems and qualities discussed above in the assembly method and system of this invention. The support members for the numerous slippery plastic tubes are relatively rigid slippery plastic strips made, for example, of high density polyethyelene (H.D.P.E.) or polypropylene and having a thickness in the range from ⅛th to ⅛th of an inch thick, with an intermediate thickness of 3/16ths of an inch being the preferred thickness for reasons discussed below. These strips are to be sufficiently thick to provide enough stiffness to avoid undue deflection under stress of large longitudinal compressional loadings developed due to buoyance effects as discussed above. On the other hand, these strips are not to be unduly thick such as to interfere with formation of keyhole slots in them as shown.

In order to capture and hold the multiple tubes, keyhole slots are formed in each strip extending into the body of the strip from its "front" edge. Each keyhole slot terminates in a rounded seat having a diameter slightly smaller than the O.D. of the tubes which are forced into these slots for becoming firmly seated in and captured by these seats. These seats are each positioned a predetermined distance from the "rear" edge of the strip for establishing the horizontal center-to-center spacing "X" of the tubes in the coiled heat exchanger and are spaced a predetermined center-to-center distance "Y" along the length of the strip for setting the vertical center-to-center spacing of the neighboring coiled tubes.

The keyhole-slotted support spacer strips get a good firm hold on each and every tube throughout the tank. So, when ice builds up on the tubes, the spacer strips keep the tube bundle, or heat exchanger, from rising because the strips press in large numbers against the rigid top or inner cover of the tank.

The density of the coiled plastic tubes within the PCM in the tank is determined by the following formula, where "d" is the O.D. of the tubes:

(1) Density $= \pi d^2/4xy = 0.786 d^2/xy$. In most installations the predetermined x and y spacings are made equal, and thus, the density formula can be simplified to:

(2) Density $= \pi/4a^2 = 0.786/a^2$, where "a" is the ratio of center-to-center tube spacing to the O.D. of the tubes.

The assembly method and system of this invention advantageously enable the density of tubing in each tank to be tailored to the particular requirements of each installation for achieving the optimum over-all economic return in a compact installation having durable, long life and reliable, predictable, excellent performance. For example, tubing densities in the range from 5% up to 32% or more are now made feasible.

The maximum tubing densities contemplated in my prior two patents referred to above is around 10%. This keyhole slot assembly method and system enables convenient and reliable superdensity coiled plastic tubing heat exchangers to be constructed durably resisting the strong forces and stresses to which their components are subjected during freeze-up. Densities above 20% are considered to be in the "superdensity" range.

It is among the objects of the present invention to provide dramatically improved coiled plastic tubing heat exchangers in tanks for containing PCM by an assembly method and system which maintains excellent overall quality and performance of the resulting heat exchangers while accomplishing the objectives inexpensively, easily and conveniently.

Further objects of the invention are to provide superdensity coiled tubing heat exchangers in tanks containing PCM capable of resisting the strong buoyancy forces and stresses occasioned by closely packed plastic tubes imbedded in a mass of liquid as the solid ice and crystals build-up around the numerous tubes.

In accordance with the present invention in one aspect there is provided a method for making a coiled tubing bundle heat exchanger in a tank for containing phase change material (PCM) which becomes frozen (solid) during extraction of heat and which becomes melted (liquid) during addition of heat comprising the steps of providing a multiplicity of relatively rigid, thick slippery plastic strips having an overall length L equal to the internal height of the tank in which the coiled tubing bundle is intended to be placed and having front and rear edges; providing a multiplicity of individual plastic tubes of slippery plastic having an outside diameter (O.D.) in the range from 9/32th of an inch (0.28125 in.) to one inch; forming uniformly spaced, keyhole shaped slots extending inwardly from the front edge of each strip each terminating in a rounded seat opening having a diameter slightly smaller than the O.D. of the tubes, with said slots in each strip being spaced apart a predetermined distance along the strip for establishing predetermined vertical spacing "Y" of the tubes and with said rounded seats located a predetermined distance from the rear edge for establishing predetermined horizontal spacing "X" of the tubes in the coiled heat exchanger; spacing the strips approximately uniformly parallel to each other extending transversely of the tubes; pushing the tubes into the respective keyhole slots in the strips for capturing the tubes in the respective seats; coiling the captured tubes into a tight spiral coil having an axis parallel with the lengths L of the strips for forming a coiled tubing bundle in which the successive convolutions of the coiled tubes are predetermindely spaced "X" from the neighboring prior convolutions by resting against the rear edges of the strips in which the portions of the tubes forming the prior convolutions are captured; and placing the coiled tubing bundle in a tank for containing PCM, with the opposite ends of the strips abutting the bottom and cover of the tank for supporting the tubes and for resisting the large buoyance forces developed by the heat exchanger in the liquid PCM and/or during build-up of frozen PCM on the multiple coiled tubes.

In accordance with this invention in another of its aspects a multiple plastic tube, coiled tubing bundle heat exchanger is provided in a tank containing PCM which becomes frozen (solid) during extraction of heat and which becomes melted (liquid) during addition of heat comprising a multiplicity of individual horizontally extending plastic tubes of slippery plastic all having the same outside diameter (O.D.) in the range from 9/32ths of an inch (0.28125 in.) to one inch, a multiplicity of relatively rigid, thick, vertical slippery plastic strips having an overall length L equal to the internal height of the tank in which the coiled tubing bundle is placed and having front and rear edges and with the upper and lower ends of each strip abutting the cover and bottom of the tank. Each of the strips has uniformly spaced, keyhole shaped slots extending inwardly from its front edge, each keyhole slot terminating in a rounded seat having a diameter slightly smaller than the O.D. of the tubes. These rounded seats are spaced vertically in each strip by a predetermined spacing "Y" for holding the tubes horizontally and spaced vertically center-to-center by said predetermined distance "Y" and with the rounded seats located a predetermined distance from the rear edge of the strip for holding the horizontal tubes spaced horizontally center-to-center by a predetermined distance "X" for establishing the desired tubing density throughout the PCM in the tank. The tubes are captured and firmly held in the respective seats of the keyhole slots in said strips for supporting and holding said tubes in spaced parallel relationship uniformly spaced apart "Y" vertically with said strips being spaced apart approximately uniformly along the length of the parallel tubes. In the spirally coiled heat exchanger the successive convolutions of the coiled tubes are advantageously separated by a predetermined spacing "X" from the neighboring prior convolutions by resting against the rear edges of the strips in which the neighboring prior convolutions of the tubes are captured. A very convenient, effective, efficient, economical and durable heat exchanger is obtained for use in tanks containing PCM.

BRIEF DESCRIPTION OF THE DRAWINGS

The various features, objects, aspects and advantages of the present invention will become more fully understood and appreciated from a consideration of the following detailed description in conjunction with the accompanying drawings describing and illustrating the best mode I contemplate for practicing this invention.

DESCRIPTION

Figure 1:
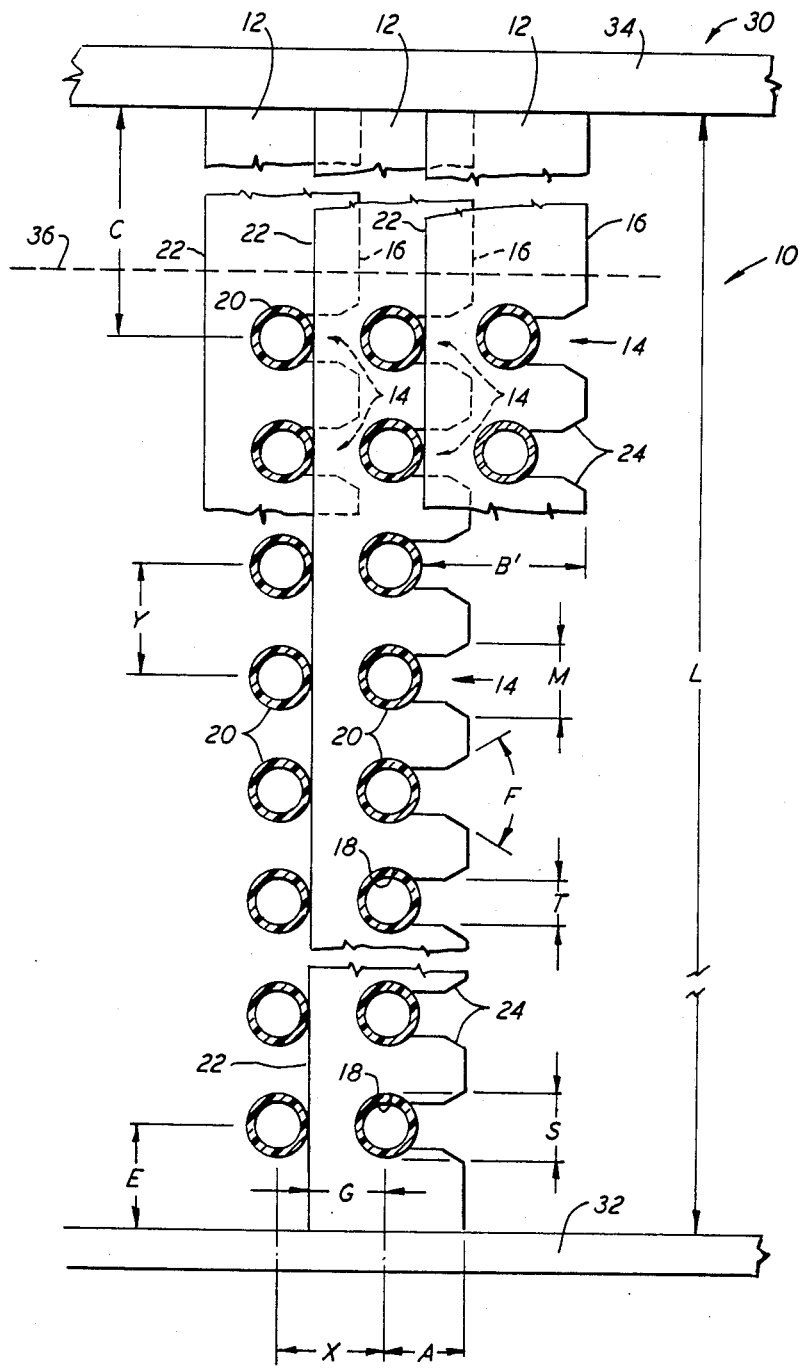
FIG. 1 is an elevational sectional view of a portion of a superdensity coiled plastic tubing heat exchanger in a tank for containing PCM and being shown full scale with portions broken away.

As explained above in the introduction, there are various severe commercial applications calling for sudden surges of cooling over relatively brief spans of time. Such brief time periods are often approximately 1.5 to 2 hours in duration.

I have found by experiment that to melt solid ice in about two hours by means of polyethylene plastic tubes embedded in the ice carrying a heat transfer liquid entering the tubes at a temperature of about 20° F. above the ice temperature requires about 4 square feet of tube surface per gallon of ice (or water) arranged as homogeneously (uniformly) as possible throughout the mass of ice. The size of the plastic tubes is desired to be relatively small (under one inch O.D.), so that they can be coiled without employing heroic measures. On the other hand, the tubes cannot be too small, because then too many of them will be required to handle the necessary flow, and hence their assembly becomes uneconomical. The preferred range of tubing O.D. is 9/32nds to ¾ths of an inch, with the optimum O.D. size being ½ inch, but it is feasible to go down to ¼th of an inch tubing O.D. or up to one inch tubing O.D.

One-half inch O.D. tubes have 0.131 square feet of surface area for every foot of length. Therefore, about 30 such tubes, one foot long, would be required in one gallon of water to provide 3.93 (about 4) sq. ft. of tube surface. Since a gallon occupies 231 cubic inches and the 30 tubes occupy 71 cubic inches, the tubing occupies 71/(231+71), or about 24% of the total volume involved. In a square pattern, and referring to the density formula (2) above, when x and y are made equal (namely, a square pattern), this 24% density value means that the ½" O.D. tubes must be spaced from each other center-to-center 0.90 of an inch, or 0.4 of an inch between the tubes. In other words, in order to provide 24% density of ½ inch O.D. tubes uniformly throughout the PCM in a tank in a square pattern requires that the spacing between tubes be only 0.4 of an inch, which is only 80% of the diameter of the very tubes themselves.

Figure 2:
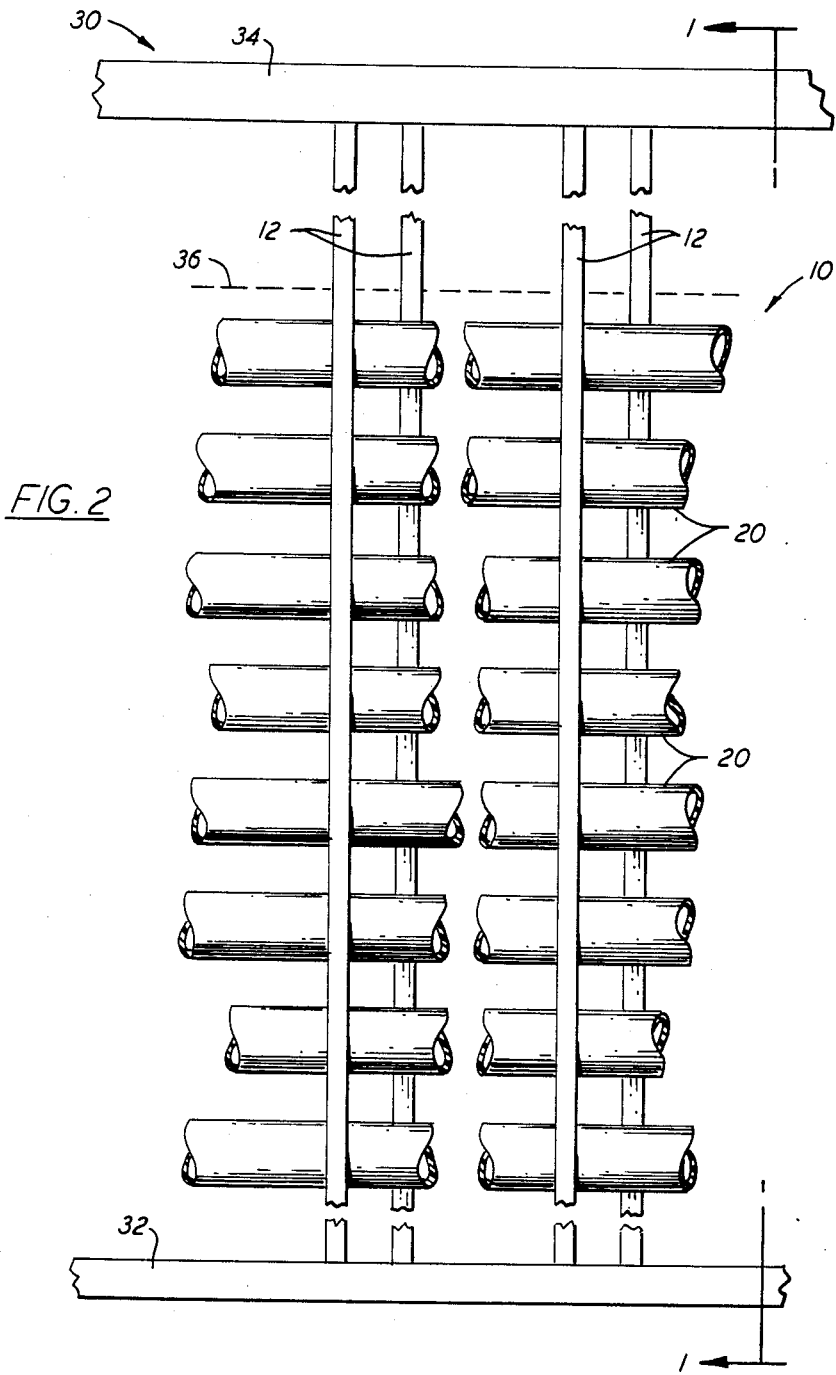
FIG. 2 is an elevational view as seen looking in the direction toward the right 2—2 in FIG. 1.
Figure 3:
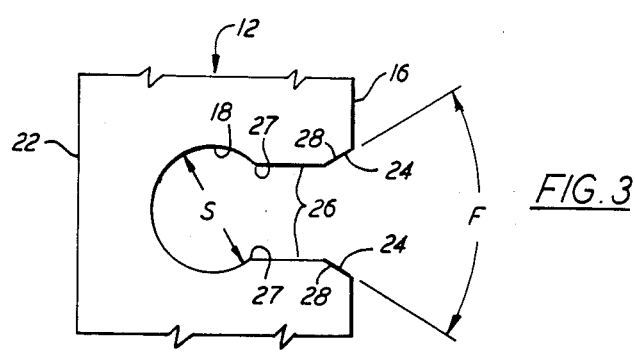
FIG. 3 shows the configuration of a keyhole slot twice full size.

Such a superdensity packing is conveniently achieved, as shown in FIGS. 1 and 2, int he coiled plastic tubing heat exchanger 10 by employing numerous relatively rigid flat strips 12 of slippery plastic made, for example, of H.D.P.E. or polypropylene and having a thickness in the range from ⅛th to ¼th of an inch thick, with an intermediate thickness of 3/16ths of an inch being shown in FIG. 2 as the optimum thickness. Keyhole-shaped slots 14 (FIG. 3) are formed in each of these strips, for example, by punching. These slippery plastic strips 12 are sufficiently thick to provide enough stiffness to avoid undue deflection under stress of large longitudinal compressional loadings developed due to large buoyancy effects. On the other hand, these strips are not unduly thick such as to interfere with formation of the keyhole slots 14. Thickness of 3/16ths of an inch is the optimum compromise I have found for the slippery plastic materials as described.

These keyhole slots 14 are formed in each strip 12 extending into the body of the strip from its "front" edge 16. Each keyhole slot terminates in a rounded seat 18 having a diameter "S" (see also FIG. 1) slightly smaller than the O.D. of the tubes 20 which are forced into these slots for becoming firmly seated in and captured by the respective seats 18. For example, in order to firmly grasp and hold tubes having an O.D. of 0.50 of an inch, the optimum value for S is 31/64th of an inch, namely, 1/64th of an inch less than the O.D., being about 1.6% less.

The rounded seats 18 are centered a predetermined distance "G" from the "rear" edge 22 of each strip such that G plus one-half of the tube O.D. will be equal to the desired horizontal center-to-center spacing "X" of the neighboring convolutions of the tubes in the heat exchanger 10. The seats 18 are spaced a predetermined center-to-center distance "Y" along the length of the strip for setting the vertical center-to-center spacing of the neighboring coiled tubes.

In order to facilitate entry of the inserted tube, each keyhole slot 14 has a funnel entrance 24 converging inwardly from the front edge 16. For example, this funnel entrance, as shown, has an entry mouth with a span "M" of 9/16ths of an inch, namely, about 6% to 7% larger than the tube O.D. for ease of entry when the tubes are being inserted perpendicular to their own length through the keyhole slots into their seats 18. The funnel entrance 24 converges inwardly at an acute angle "F", for example, in the range from 30° to 75°. I have found that a funnel angle F of about 60° works to advantage.

For obtaining a good firm grip on the fully inserted tubes, each of the keyhole slots 14 has a narrow throat 26 (FIG. 3) which communicates directly into the rounded seat opening 18, thereby creating shoulders 27 for retaining the inserted tubes in their seats 18. For example, as shown, each throat 26 has a width T of ⅜ths of an inch, i.e. this throat has a width of only 75% of the O.D. of the tube to be inserted through it. Consequently, during the insertion thrust, the H.D.P.E. tube 20 momentarily resiliently flattens sufficiently on each side to pass through the narrow throat 26 and then immediately resiliently springs back to a circular configuration in the tightly embracing seat 18.

In order to aid in producing a momentary resilient flattening of the inserted tube, both edges of the funnel entrance 24 are rounded at 28 forming curved transitions which are tangent to the edges of the funnel entrance 24 and also tangent to the edges of the throat 26. For example, as shown, this rounding at 28 has a radius of 3/16ths of an inch, namely, a radius of curvature equal to about 75% of the radius of the O.D. of the tube itself.

The strips 12 are spaced approximately uniformly along the length of the tubes 20, for example, by a spacing in the range from 1 foot to 3 feet. The more densely that the tubes 20 are to be packed in the coiled heat exchanger 10, the more of the strips 12 which will be included for maintaining the accuracy of the spacing with neighboring convolutions of the coiled heat exchanger, and so the closer these strips are positioned along the length of the tubes within this 1 to 3 foot range, and vice versa.

Figure 4:
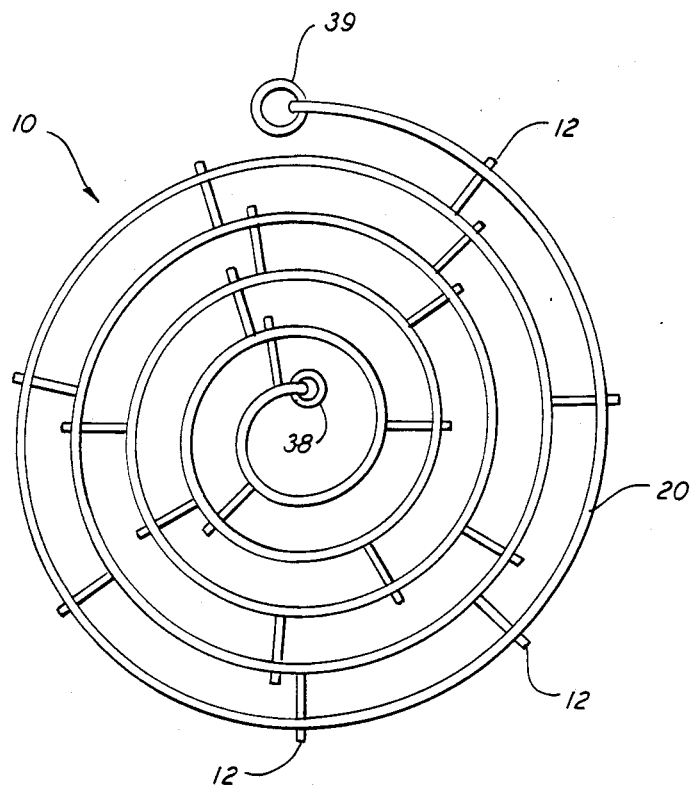
FIG. 4 is a somewhat schematic plan view of the coiled tubing.

After all of the tubes 20 have been inserted and are captured in their respective seats 18, these captured tubes are firmly held uniformly spaced extending parallel to each other. Suitable conduit connections 38 and 39 (see FIG. 4) are made to the ends of the tubes, as will be understood from the above referenced patents. Then, these captured parallel tubes are rolled up into a spiral roll 10 whose axis is parallel with the length "L" of the strips 12. As shown in FIG. 1, the rear edges 22 of the strips are in contact with the neighboring convolutions of the tubes 20, and thus the distance G establishes the predetermined horizontal center-to-center spacing "X". The rear edges 22 preferably all face inwardly toward the axis of the heat exchanger 10.

The center of each seat 18 is spaced inwardly a distance "A" from the front edge 16 of the strip. The overall width "B" of each strip is the sum of "A" plus "G".

These support strips 12 have a length L equal to the internal height of the tank 30 between the bottom wall 32 and the rigid top or inner cover 34 of the tank. Thus, these strips 12 are adapted normally to rest on the bottom wall 32 for supporting the weight of the heat exchanger 10. The keyhole-slotted support spacer strips 12 provide a firm gripping hold on each and every tube 20 throughout the tank 30. Thus, when ice builds up on the tubes, the spacer strips 12 keep the tube bundle heat exchanger 10 from rising, because the strips press in large numbers against the rigid cover 34 which is strongly and securely fastened to the side wall (not shown) of the tank 30.

In FIG. 1, the dimension "E" is the spacing between the center of the lowermost seat 18 and the lower end of the strip 12. This dimension E is preferably slightly less than Y or may be equal to but not more than Y for achieving an effectively uniform tubing distribution within the PCM throughout the tank. The dimension "C" is the distance from the center of the uppermost seat 18 to the upper end of the strip 12. C is usually in the range between 3.5 and 7.75 inches depending upon the internal tank height and the relative expansion of some PCM's during freezing. As indicated by the dashed line 36, the melted (liquid) PCM fully covers the uppermost tube 20 in the exchange 10. The taller the tank and the greater the expansion of the PCM 36 during freezing, the greater "C" will be in order to provide sufficient headroom below the cover 34 for accommodating the expected overall expansion of some PCM's during freeze up, without its contacting the cover 34.

It will now be understood that any desired predetermined horizontal and vertical spacings X and Y within reasonable limits can be achieved by selecting the strip width B including the desired distance G from the rear edge 22 to the seat center and by selecting the slot spacing Y. If the ice or other PCM 36 must be melted more quickly, then the strips 12 are narrower, and the keyhole slots 14 are closer together. If a slower melting period, such as cooling a building over 10 occupied hours, were desired, the strips would be wider and the keyhole slots farther apart. If the anti-freeze heat transfer liquid leaving the tubes 20 of the tank/heat exchanger 10 were required to be closer to the freezing point of water, such as for a low temperature air conditioning duct system, then the strips would be narrower and the keyhole slots closer together. Conversely, if a standard temperature duct system were used, wider strips and wider keyhole slot spacings could be used and thus save cost.

As the strip width B and the rear edge to seat center distance G is reduced, the spiral convolutions of the tubes 30 become closer together, or, in other words, the spiral becomes more tightly wound. As the spiral becomes more tightly wound, the tubes become longer to fill out a given diameter tank 30. Longer tube lengths mean higher pressure drops for the ethylene glycol and water anti-freeze solution being circulated through the tubes, and thus higher circulating pump power is needed to produce a given flow rate when faced with a higher pressure drop. The increased pressure drop in each longer tube is somewhat offset by the fact that there are now more tubes connected in parallel by virtue of having more spirals of tubes, because of their closer vertical spacing and less total ice to be frozen. However, the over-riding faster melt down requirement means that greater total flow is called for, and so the overall net effect is higher pressure drop.

The easiest way to counteract this increased pressure drop is to reduce the tank diameter and to use more tanks. I have found that reducing the ice volume about in half or, in other words, reducing the diameter of the tank 30 by the square root of one-half gives about equivalent pressure drop between a low density and a high density heat exchanger.

EXAMPLES

Examples of various coiled tubing heat exchangers 10 are given in the following table, which also sets forth the resultant tubing density in the PCM 36 in the tank 30. The tubing O.D. is one-half of an inch for each example:

| A (in.) | G (in.) | X (in.) | Y (in.) | Tubing Density in the PCM |
|---------|---------|---------|---------|---------------------------|
| 0.5     | 0.55    | 0.8     | 0.8     | 31%                       |
| 0.5     | 0.60    | 0.85    | 0.85    | 27%                       |
| 0.6     | 0.65    | 0.9     | 0.9     | 24%                       |
| 0.65    | 0.75    | 1.0     | 1.0     | 20%                       |
| 0.65    | 0.85    | 1.1     | 1.1     | 16%                       |
| 0.65    | 0.95    | 1.2     | 1.2     | 14%                       |
| 0.65    | 1.15    | 1.4     | 1.4     | 10%                       |
| 0.65    | 1.35    | 1.6     | 1.6     | 8%                        |
| 0.65    | 1.50    | 1.75    | 1.75    | 6%                        |

It will be understood that the dimension G in large measure determines the strength of the strips 12. Therefore, as B is increased, G is increased more than A. For wider strips, A may be kept constant at a reasonable value, for example, 0.65 inches, as shown, or 0.75 inches. There are sufficient strips 12 to resist the total buoyancy. It will be understood that the density of the circulating anti-freeze heat transfer liquid relative to the density of the PCM will affect the total buoyancy. In addition to the ethylene glycol solution discussed above, other suitable anti-freeze liquids which are sometimes used are a methanol solution or a solution of calcium chloride in water, but ethylene glycol solution is usually preferred.

As used herein, the terms "frozen" and "melted" are intended to include crystallized and decrystallized states, respectively. In some cases additives are included in the PCM to form a gel-like structure to contain the melted PCM distributed in multitudes of tiny pores throughout the gel-like structure.

In the heat exchanger coil 10, the rear edges 22 of all strips preferably all face in the same direction. These rear edges 22 may all face inwardly toward the axis of the coil 10 or they may all face outwardly toward the perimeter of the coil 10, i.e. toward the side wall of the tank 30.

What is claimed is:

1. A coil tube bundle for a heat exchanger which comprises
    (a) a multiplicity of substantially rigid strips each formed with equally spaced slots inwardly along a front edge thereof and with each slot defining a seat opening through a narrower funnel throat to the front edge of the strip,
    (b) the strips being parallel to one another with their respective slots aligned in spiral rows and facing in the same direction relative to a central axis of said spiral rows, and
    (c) flexible tubes of resilient circular cross section spirally disposed across the strips with each tube tightly embraced within the seats of a row of slots to form a coiled interconnected grid of rigid strips and flexible tubes with convolutions of each tube contacting and being spaced apart by rear edges of the strips opposite the front edges and with the tubes supported at substantially equal intervals throughout their lengths.

2. A tube bundle according to claim 1 wherein the tube bundle is contained between a cover and a bottom of a tank with opposite ends of the strips aligned and abutting the cover and bottom, the bundle being emersed in a liquid phase-change material which is expandable upwardly toward the cover upon freezing.

3. A tube bundle according to claim 1 wherein the rear edges of the strips in the bundle face inwardly toward the central axis.

4. A tube bundle according to claim 1 wherein the front edges of the strips in the bundles are spaced from the tubes.

5. A multiple plastic tube, coiled tubing bundle heat exchanger for use in a tank for containing phase change material (PCM) which becomes frozen during extraction of heat and which becomes melted during addition of heat comprising:
    a multiplicity of individual horizontally extending plastic tubes all having an outside diameter (O.D.) in the range from 9/32ths of an inch (0.28125 in.) to one inch,
    a multiplicity of relatively rigid, thick, vertical plastic strips having an overall length L comparable with the internal height of the tank in which the coiled tubing bundle is to be placed and having front and rear edges and with the upper and lower ends of each strip for positioning near the cover and bottom of the tank,
    each of said strips having generally uniformly spaced tube-capturing slots extending inwardly from its front edge,
    each tube capturing slot terminating in a seat opening having an effective size for firmly gripping the O.D. of the tubes,
    said seats being spaced vertically in each strip by a predetermined spacing "Y" for holding the tubes horizontally and spaced vertically center-to-center by said predetermined distance "Y" and with the seats located a predetermined distance from the rear edge of the strip for holding the horizontal tubes spaced horizontally center-to-center by a predetermined distance "X" for establishing the desired tubing density throughout the PCM in the tank,
    said tubes being captured in the respective seats of the slots in said strips for supporting and holding said tubes at substantially equal intervals throughout their lengths in spaced parallel relationship uniformly spaced apart "Y" vertically with said strips being spaced apart approximately uniformly along the length of the parallel tubes,
    said parallel tubes being coiled into a spiral coil as seen in plan view having an axis parallel with the length L of the strips forming a coiled tubing bundle in which the strips are parallel with their seats aligned in spiral rows and facing the same direction relative to a center axis of the spiral rows and successive convolutions of the coiled tubes are predeterminedly spaced "X" from the neighboring convolutions by resting against the rear edges of the strips in which the neighboring convolutions of the tubes are seated.

6. A coiled tubing heat exchanger as claimed in claim 5, in which
    said tube-capturing slots include a funnel entrance converging inwardly from the front edge of the strip, and
    each funnel entrance has an entry mouth width "M" wider than the O.D. of the tubes.

7. A coiled tubing heat exchanger as claimed in claim 5, in which
    said tube-capturing slots have a keyhole shape and each includes a narrow throat region located between the front edge of the strip and the seat,
    the narrow throat communicates directly with the seat forming a pair of shoulders at the juncture of the throat region and the seat, and
    the spacing "T" between said shoulders is sufficiently less than the tubing O.D. for firmly retaining said tube, wherein said tube is a stiffly flexible, resiliently deformable plastic tube inserted into the seat by an insertion thrust exerted perpendicular to the tube axis.

8. A coiled tubing heat exchanger claimed in claim 7, in which said spacing "T" between the shoulders is at least 10% less than the O.D. of the tube.

9. A coiled tubing heat exchanger as claimed in claim 7, in which the stiffly flexible, resiliently deformable tubes are formed of polyethylene and have a tubing wall thickness of about 1/16th of an inch.

10. A coiled tubing heat exchanger as claimed in claim 9, in which the stiffly flexible, resiliently deformable tubes are formed of polyethylene and have a tubing wall thickness of about 1/16th of an inch.

11. A coiled tubing heat exchanger as claimed in claim 5, in which the coiled heat exchanger is self-supporting when free-standing before being installed in the tank.

* * * * *